United States Patent [19]
Myers

[11] Patent Number: 5,337,047
[45] Date of Patent: Aug. 9, 1994

[54] AIRCRAFT EXTERNAL LIGHTING APPARATUS, METHOD AND CODING SYSTEM FOR AIRCRAFT IDENTIFICATION

[76] Inventor: Michael V. Myers, 1504 E. Sheridan Ave., Olathe, Kans. 66062

[21] Appl. No.: 935,864

[22] Filed: Aug. 26, 1992

[51] Int. Cl.$^5$ .............................. G08B 21/00
[52] U.S. Cl. .................................... 340/945
[58] Field of Search ............ 340/945, 952, 953, 956, 340/959, 961, 973, 981, 982; 362/62; 342/54

[56] References Cited

U.S. PATENT DOCUMENTS

| | | | |
|---|---|---|---|
| 2,777,120 | 1/1957 | Madsen | 340/82 |
| 2,876,388 | 3/1959 | Bader et al. | 315/292 |
| 3,183,480 | 5/1965 | Adler, Jr. | 340/27 |
| 3,436,729 | 4/1969 | Zurcher | 340/87 |
| 3,706,968 | 12/1972 | Turner, Jr. | 340/25 |
| 4,277,170 | 7/1981 | Miles | 356/152 |
| 4,302,796 | 11/1981 | Gustauson et al. | 362/62 |
| 4,346,430 | 8/1982 | Holland | 362/62 |
| 4,477,796 | 10/1984 | Kearsley | 340/105 |

Primary Examiner—John K. Peng
Assistant Examiner—Tim Johnson
Attorney, Agent, or Firm—John R. Flanagan

[57] ABSTRACT

An apparatus on an aircraft provides external aircraft lighting which incorporates a coding system to facilitate visual identification of the aircraft. The lighting apparatus includes a plurality of optically-coupled components for generating, transmitting and projecting a laser beam. The components are installed in an interior compartment of the aircraft and are operable to generate the laser beam, to transmit the generated laser beam to a location adjacent to an exterior portion of the aircraft fuselage, and to project the transmitted laser beam in a predetermined direction from the exterior portion of the aircraft and in a predetermined pattern. The coding system incorporated by the pattern is based upon the properties of beam color, beam portion number and beam pulse frequency. Different values are assigned for these properties to code the different characteristics which can be used to identify the aircraft.

29 Claims, 3 Drawing Sheets

AIRCRAFT EXTERNAL LIGHTING APPARATUS, METHOD AND CODING SYSTEM FOR AIRCRAFT IDENTIFICATION

BACKGROUND OF THE INVENTION

1. Field of the Invention

The present invention generally relates to avoiding aircraft collisions and, more particularly, is concerned with an aircraft external lighting apparatus, method and coding system for identifying different characteristics of aircraft.

2. Description of the Prior Art

The problem of avoiding collisions between two aircraft both mid-air and on the ground continues to grow as general, commercial and military aircraft flight traffic continues to increases. It is important for pilots and air traffic controllers to be able to see nearby aircraft so as to maintain aircraft separation and avoid collisions.

Various flashing lights have been proposed in the past to indicate the presence of nearby aircraft and the rate and direction of movement and altitude of the aircraft. For instance, U.S. Pat. No. 2,777,120 to Madsen proposed an external lighting system which included electronic flash tubes disposed in longitudinally spaced and vertically aligned relationship along the top and bottom of the fuselage of an aircraft. The lights are sequentially fired in a rearward to forward direction to assist pilots of other aircraft in determining the approximate rate and direction of movement and positional altitude of the aircraft. U.S. Pat. No. 2,876,388 to Bader et al proposed an external visual warning light system which includes sequentially-operated visual high intensity flash tubes mounted only at the top and bottom of the fuselage of an aircraft. The purposes of the light system is the same as in the case of the Madsen patent.

Also, systems employing lights having different colors have been proposed in the past for purposes similar to those of the flashing lights, that is, to indicate the presence of nearby aircraft and the rate and direction of movement and altitude of the aircraft. For instance, U.S. Pat. No. 3,183,480 to Adler, Jr. proposed an external light system on an aircraft used to indicate the flight level of the aircraft. Lights of different colors are used. They are extinguished and lit as the aircraft changes altitude from one flight level to another.

The approaches taken thus far in the prior art by the different proposed external light systems to avoid aircraft collisions probably represent steps in the right direction. However, these proposed external light systems fail to convey specific information about distinguishing characteristics of the aircraft itself, such as size and performance. Such information acquired on a timely basis by pilots and air traffic controllers would be invaluable in assessing the threat posed by nearby aircraft and in formulating a plan for maintaining aircraft separation and avoiding collisions.

Consequently, a need still exists for improvement of external lighting systems for aircraft identification purposes.

SUMMARY OF THE INVENTION

The present invention provides an aircraft external lighting apparatus, method and coding system designed to satisfy the aforementioned need. The aircraft external lighting apparatus, method and coding system of the present invention are adapted for facilitating the visual identification of certain characteristics of aircraft, such as engine type, number of engines, and aircraft weight class, to the air traffic control tower and to other aircraft while the aircraft is in position on a runway and holding for departure and also while the aircraft is airborne.

Accordingly, the present invention is directed to an apparatus and method used on an aircraft for providing external aircraft lighting to facilitate visual identification of the aircraft by others. The external aircraft lighting apparatus and method of the present invention employ the operative steps of: (a) generating a laser beam on an aircraft, such as in an interior compartment of the aircraft; (b) transmitting the laser beam on the aircraft, such as to adjacent to an exterior portion of the aircraft; and (c) projecting the laser beam from the aircraft into space, such as from the exterior portion of the aircraft. The laser beam is projected in a predetermined direction from the exterior portion of the aircraft and in a preselected pattern based upon at least one and preferably a plurality of preselected properties, namely, beam color, number of projected beam portions, and beam pulse frequency, which code different characteristics identifying the aircraft, namely, engine type, number of engines and aircraft weight class. Also, the direction in which the laser beam is directed from the exterior portion of the aircraft is along a path preferably extending at an acute angle falling within the range of about 30° to 45° in an upward and aft direction relative to the longitudinal axis of the aircraft.

The present invention further is directed to an external aircraft lighting coding system for facilitating visual identification of the aircraft. The external aircraft lighting coding system comprises a light pattern projected from an exterior portion of the aircraft. The light pattern includes a laser beam having a number of portions, ranging from at least one to four, which correspond to the number of engines on the aircraft. The laser beam portions have one of a plurality of different colors which correspond to the type of engine on the aircraft. The laser beam portions have a pulse frequency which corresponds to the weight class of the aircraft.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
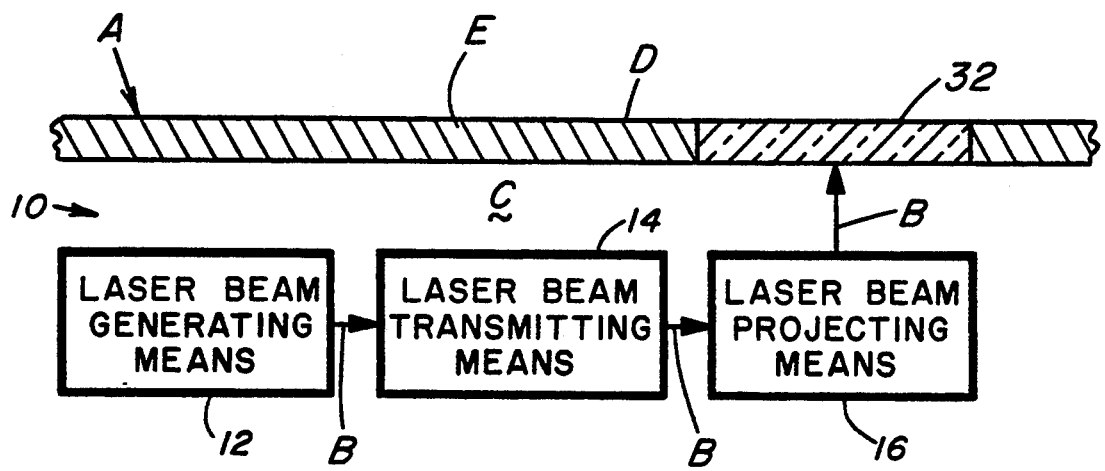
FIG. 1 is a general block diagram of an aircraft external lighting apparatus of the present invention for facilitating visual identification of the aircraft.

Referring to the drawings, and particularly to FIG. 1, there is shown a general block diagram of an aircraft external lighting apparatus, generally designated 10, of the present invention for facilitating visual identification of an aircraft A. The external lighting apparatus 10, which operates in accordance with the method of the present invention, basically includes generating means 12 for generating a light, preferably a laser, beam B in an interior compartment C of the aircraft A, transmitting means 14 optically coupled to the generating means 12 for receiving the laser beam B and for transmitting the laser beam B to adjacent an exterior portion D of the aircraft A, and projecting means 16 optically coupled to the transmitting means 14 for receiving the laser beam B and for projecting the laser beam B from the exterior portion D of the aircraft A. The laser beam B is projected in a desired direction from the exterior portion D of the aircraft A and in a preselected pattern based upon at least one and preferably a plurality of preselected properties which code characteristics of the aircraft which are useful in identifying and distinguishing the aircraft from other aircraft.

The lighting apparatus 10 of the present invention is set to direct the laser beam B from the exterior portion D of the aircraft fuselage E along a path preferably extending at an acute angle falling within the range of approximately 30° to 45° in the upward and aft direction relative to the longitudinal axis of the aircraft A. Such laser beam B serves not only to identify certain characteristics of the aircraft A (such as the type of engine, number of engines and weight class of the aircraft) but also acts as a pointer indicating in which direction the aircraft is facing.

A given pattern of the laser beam B employs a lighting coding system for a given aircraft in accordance with the present invention for facilitating identification of the aircraft. The properties of the light patterns making up the coding system of the present invention are preferably beam color, number of separate portions of the laser beam projected, and frequency of laser beam pulses. The parameters of the coding system are preferably as follows: (1) Different colors of the laser beam correspond to different types of engines. For purposes of example only and not by way of limitation, red color stands for a piston-type engine, orange color stands for a turboprop-type engine, and blue color stands for a turbojet-type engine. (2) The number of separate portions making up the projected laser beam B correspond to the number of engines on the aircraft. For purposes of example only and not by way of limitation, one beam portion stands for a single engine, two beam portions stand for twin engines, three beam portions stand for three engines, and four beam portions stand for four engines. (3) The frequency of the pulses of the projected laser beam B corresponds to the weight class of the aircraft. For purposes of example only and not by way of limitation, one pulse per second stands for a small aircraft, two pulses per second stands for a large aircraft, and three pulses per second stands for a heavy aircraft. A "small" aircraft has 12,500 pounds or less maximum certificated takeoff weight. A "large" aircraft has more than 12,500 pounds up to 300,000 pounds, maximum certificated takeoff weight. A "heavy" aircraft is capable of a certificated takeoff weight of 300,000 pounds or more. Also, four pulses per second could be assigned to stand for a fourth category called "high performance" aircraft.

As stated above, the values specified for the preselected properties of the light patterns making up the coding are exemplary only. Other values of the properties can be chosen contingent upon laser characteristics and other limitations. Also, it should be understood that the parameters of the coding system can be modified such that beam color stands for size of aircraft, beam portion number stands for type of engine, and beam pulse frequency stands for number of engines, or such that beam color stands for the number of engines, beam portion number stands for size of aircraft, and beam pulse frequency stands for type of engine.

Figure 2:
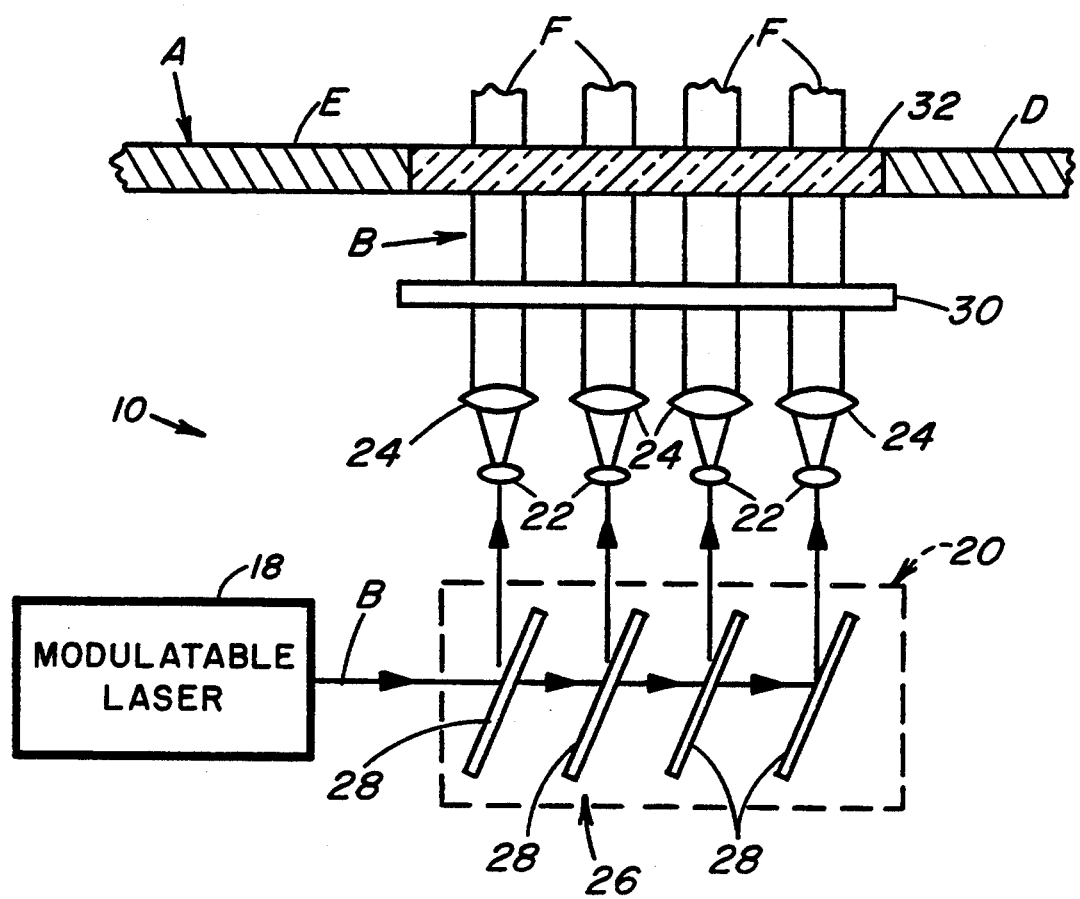
FIG. 2 is a more detailed diagram of the aircraft external lighting apparatus of the present invention.

Referring to FIG. 2, there is illustrated a more detailed diagram of the aircraft external lighting apparatus 10 of the present invention. The laser beam generating means 12 of the lighting apparatus 10 of FIG. 1 can include a modulatable laser 18 having built-in modulation circuitry capable of turning "on" and "off" the laser beam B in the desired manner for generating the laser beam B in pulsed form. As an example, the modulatable laser 18 can be a conventional modulatable He-Ne laser.

The laser beam transmitting means 14 of the lighting apparatus 10 of FIG. 1 can include a beam multiplier assembly 20 and a plurality of sets of beam expanding and collimating lenses 22, 24 when more than one laser beam portion is to be projected in the light beam pattern. If the light pattern to identify the particular aircraft employing the lighting apparatus 10 includes only one laser beam portion, then the beam multiplier assembly 20 would not be used and only one set of beam expanding and collimating lenses 22, 24 would be employed. However, when the beam multiplier assembly 20 is used, it can incorporate a compound optical wedge 26 which functions to split the laser beam B in the desired number of beam portions F. The number of wedge segments 28 that are employed in the compound optical wedge 26 correspond to the desired number of beam portions F to be produced for a particular light pattern. The beam portions F are reflected by the compound optical wedge 26 along slightly divergent but substantially parallel paths. The sets of beam expanding and collimating lenses 22, 24 increase each of the laser beam portions F to the desired cross-sectional diameter.

The laser beam projecting means 16 of the lighting apparatus 10 of FIG. 1 can include selected ones of a plurality of color filters 30 for producing the desired colors of the laser beam portions F. For example, red, orange and blue cellophane filters can be utilized. It is noted that the helium-neon laser itself generates an intense output of red light. The laser beam projecting means 16 also includes a transparent window 32 for tranporting the laser beam portions F from the pressurized interior compartment C of the aircraft through the exterior portion D of the fuselage E thereof into the space or atmosphere surrounding the aircraft.

FIGS. 3–10 illustrate examples of commercial aircraft which fit into eight different identifiable categories of aircraft by using the external lighting apparatus 10 and the coding system of the present invention. These eight different categories are assigned or coded by eight different patterns of the laser beam B in accordance with the coding system of the present invention which patterns are produced by the external lighting apparatus 10 of the present invention. The eight different patterns can be constructed from the three properties described above since there are eight possible combinations of the three properties of color, number of beam portions and pulse frequency.

Figure 3:
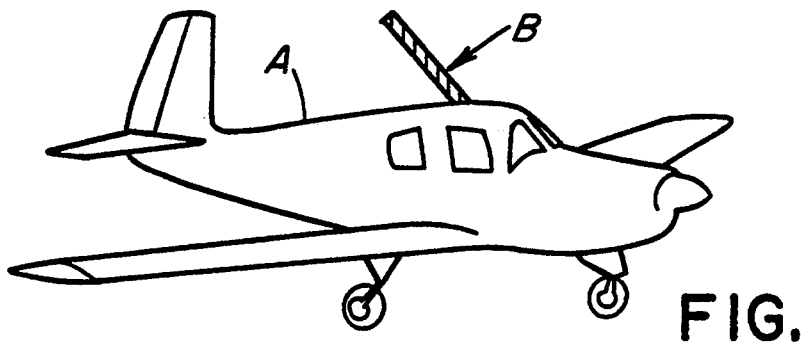
FIG. 3 is a perspective view of an aircraft in a first category and of a first pattern of a laser beam utilizing the lighting coding system of the present invention for visually identifying the aircraft in that category.

Referring to FIG. 3, the illustrated commercial aircraft of the first category is a Mooney Master. The lighting apparatus 10 of the present invention installed on the first category of aircraft produces laser light in a first pattern in accordance with the coding system of the present invention. The first pattern of laser light has a single laser beam B indicating that the aircraft A has a single engine. The laser beam B has a red color indicating that the aircraft has a piston-type engine. The laser beam B is produced at one pulse per second indicating an aircraft of the small weight class.

Figure 4:
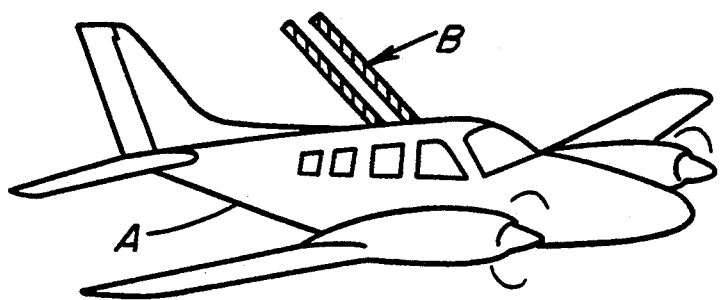
FIG. 4 is a perspective view of an aircraft in a second category and of a second pattern of a laser beam utilizing the lighting coding system of the present invention for visually identifying the aircraft in that category.

Referring to FIG. 4, the illustrated commercial aircraft of the second category is a Beech Baron 58. The lighting apparatus 10 of the present invention installed on the second category of aircraft produces laser light in a second pattern in accordance with the coding system of the present invention. The second pattern of laser light has a pair of laser beam portions B indicating that the aircraft A has twin engines. The laser beam B has a red color indicating that the aircraft has piston-type engines. The laser beam B is produced at one pulse per second indicating an aircraft of the small weight class.

Figure 5:
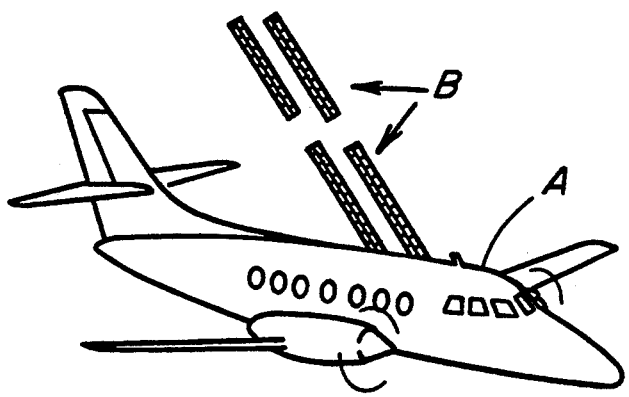
FIG. 5 is a perspective view of an aircraft in a third category and of a third pattern of a laser beam utilizing the lighting coding system of the present invention for visually identifying aircraft in that category.

Referring to FIG. 5, the illustrated commercial aircraft of the third category is a BAe Jetstream 31. The lighting apparatus 10 of the present invention installed on the third category of aircraft produces laser light in a third pattern in accordance with the coding system of the present invention. The third pattern of laser light has a pair of laser beam portions B indicating that the aircraft A has twin engines. The laser beam B has an orange color indicating that the aircraft has turboprop-type engines. The laser beam B is produced at two pulses per second indicating an aircraft of the large weight class.

Figure 6:
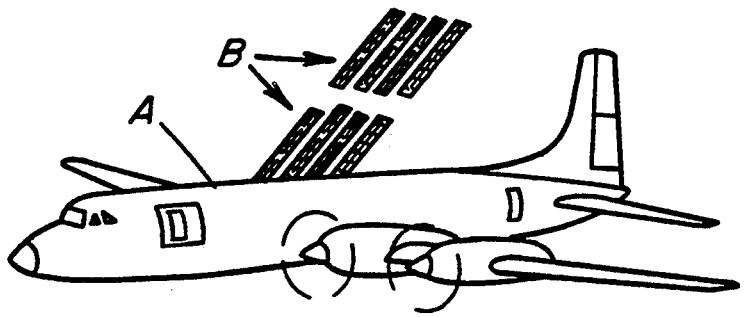
FIG. 6 is a perspective view of an aircraft in a fourth category and of a fourth pattern of a laser beam utilizing the lighting coding system of the present invention for visually identifying aircraft in that category.

Referring to FIG. 6, the illustrated commercial aircraft of the fourth category is a Canadair CL44. The lighting apparatus 10 of the present invention installed on the fourth category of aircraft produces laser light in a fourth pattern in accordance with the coding system of the present invention. The fourth pattern of laser light has four laser beam portions B indicating that the aircraft A has four engines. The laser beam B has an orange color indicating that the aircraft has turboprop-type engines. The laser beam B is produced at two pulses per second indicating an aircraft of the large weight class.

Figure 7:
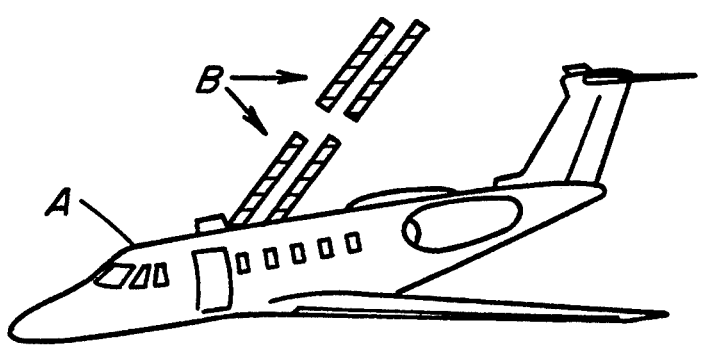
FIG. 7 is a perspective view of an aircraft in a fifth category and of a fifth pattern of a laser beam utilizing the lighting coding system of the present invention for visually identifying aircraft in that category.

Referring to FIG. 7, the illustrated commercial aircraft of the fifth category is a Cessna Citation III. The lighting apparatus 10 of the present invention installed on the fifth category of aircraft produces laser light in a fifth pattern in accordance with the coding system of the present invention. The fifth pattern of laser light has a pair of laser beam portions B indicating that the aircraft A has twin engines. The laser beam B has a blue color indicating that the aircraft has turbojet engines. The laser beam B is produced at two pulses per second indicating an aircraft of the large weight class.

Figure 8:
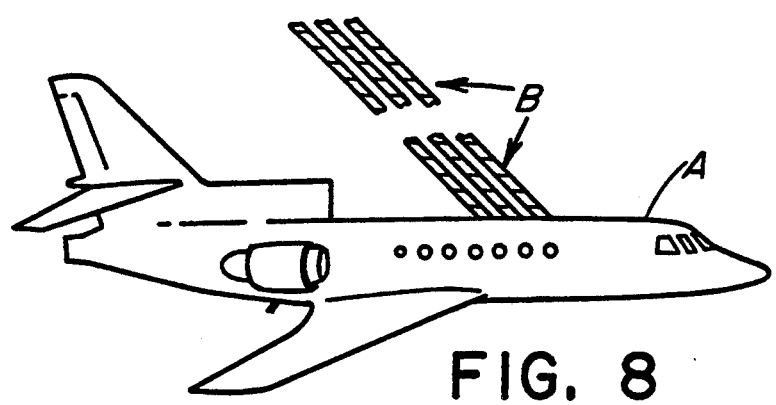
FIG. 8 is a perspective view of an aircraft in a sixth category and of a sixth pattern of a laser beam utilizing the lighting coding system of the present invention for visually identifying aircraft in that category.

Referring to FIG. 8, the illustrated commercial aircraft of the sixth category is a Falcon 50. The lighting apparatus 10 of the present invention installed on the sixth category of aircraft produces laser light in a sixth pattern in accordance with the coding system of the present invention. The sixth pattern of laser light has three laser beam portions B indicating that the aircraft A has three engines. The laser beam B has a blue color indicating that the aircraft has turbojet engines. The laser beam B is produced at two pulses per second indicating an aircraft of the large weight class.

Figure 9:
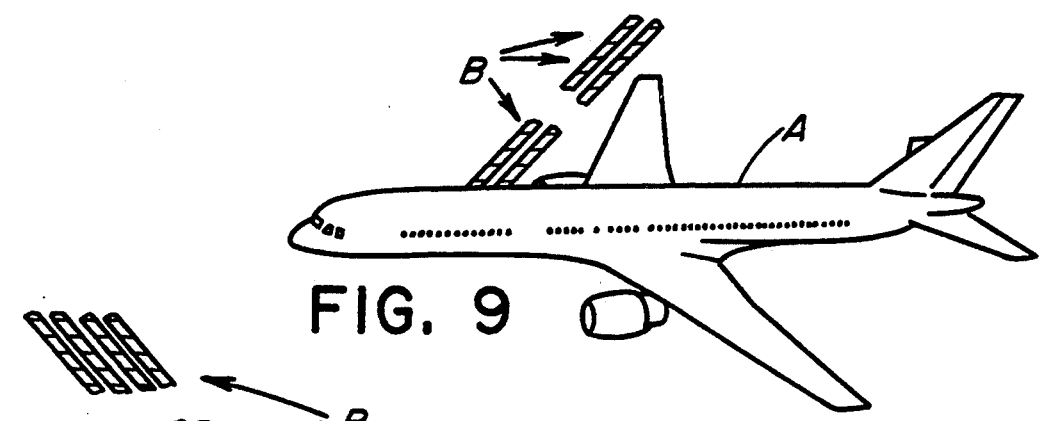
FIG. 9 is a perspective view of an aircraft in a seventh category and of a seventh pattern of a laser beam utilizing the lighting coding system of the present invention for visually identifying aircraft in that category.

Referring to FIG. 9, the illustrated commercial aircraft of the seventh category is a Boeing 757. The lighting apparatus 10 of the present invention installed on the seventh category of aircraft produces laser light in a seventh pattern in accordance with the coding system of the present invention. The seventh pattern of laser light has two laser beam portions B indicating that the aircraft A has two engines. The laser beam B has a blue color indicating that the aircraft has turbojet engines. The laser beam B is produced at two pulses per second indicating an aircraft of the large weight class.

Figure 10:
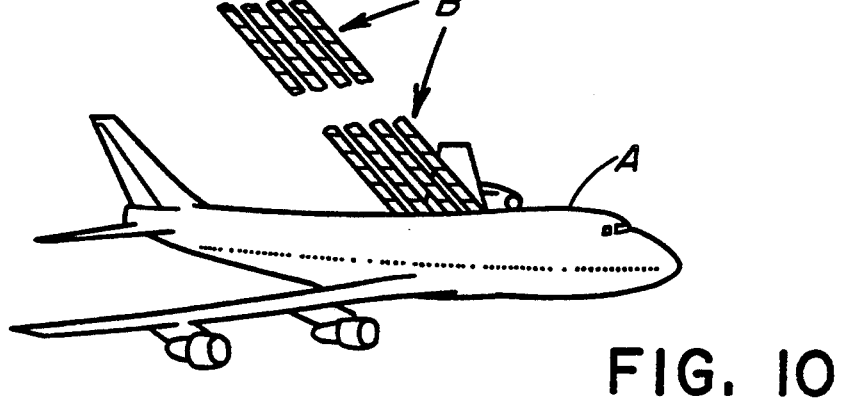
FIG. 10 is a perspective view of an aircraft in a eighth category and an eighth pattern of a laser beam utilizing the lighting coding system of the present invention for visually identifying aircraft in that category.

Referring to FIG. 10, the illustrated commercial aircraft of the eighth category is a Boeing 747. The lighting apparatus 10 of the present invention installed on the eighth category of aircraft produces laser light in an eighth pattern in accordance with the coding system of the present invention. The eighth pattern of laser light has four laser beam portions B indicating that the aircraft A has four engines. The laser beam B has a blue color indicating that the aircraft has turbojet engines. The laser beam B is produced at three pulses per second indicating an aircraft of the heavy weight class.

To summarize, the external lighting apparatus 10 is intended for installation in the interior compartment C of the aircraft A and is operable to launch a laser beam B having one of a plurality of preselected patterns in a predetermined direction into the space above the aircraft A from and relative to the exterior portion D of the fuselage E of the aircraft A. All of the preselected patterns of the laser beam B incorporate the coding system of the present invention which utilizes laser beam color, number and pulse frequency to code the identifying characteristics of the aircraft. The patterns, which differ from one another so as to permit distinguishing one pattern from the next, are based upon these identifying characteristics which all aircraft A have and which can be used to categorize or distinguish between the different aircraft. These characteristics preferably are engine type, number of engines and aircraft weight class. Perhaps others would be specified. These characteristics and how they differ from one category of aircraft to the next are familiar to and thus will be recognized and understood by air traffic controllers and pilots of other aircraft. Therefore, these characteristics constitute a practical means of representing a particular aircraft and of facilitating the visual identification of the particular aircraft, either while the aircraft is in position on a runway and holding for departure or while the aircraft is airborne.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. An apparatus installable on an aircraft for providing external aircraft lighting to facilitate visual identification of the aircraft, said external aircraft lighting apparatus comprising:
   (a) means, disposed on the aircraft, for generating a light beam on the aircraft; and
   (b) means, disposed on the aircraft and being optically coupled to said generating means, for receiving said light beam therefrom and for projecting said light beam from the aircraft into space in a preselected pattern based upon at least one property of said preselected pattern coding a physical characteristic identifying the aircraft.

2. The apparatus of claim 1 wherein said property of said pattern coding the physical characteristic identifying the aircraft is one of beam color, beam number and beam pulse frequency.

3. The apparatus of claim 1 wherein said preselected pattern includes a plurality of different properties coding a plurality of physical characteristics identifying the aircraft, said different properties are beam color, number of beams and beam pulse frequency, each of said different properties of said preselected pattern corresponding to a different one of the aircraft characteristics of engine type, number of engines and aircraft weight class.

4. The apparatus of claim 3 wherein:
   said beam color in said preselected pattern corresponds to the engine type;
   said number of beams in said preselected pattern corresponds to the number of engines; and
   said beam pulse frequency in said preselected pattern corresponds to the aircraft weight class.

5. The apparatus of claim 1 wherein said light beam is a laser beam.

6. The apparatus of claim 5 wherein said means for projecting said laser beam from the aircraft into space is also operable for directing said laser beam into space in a predetermined direction relative to a longitudinal axis of the aircraft.

7. The apparatus of claim 6 wherein said direction in which said laser beam is directed into space by said projecting means is along a path extending at an acute angle falling within the range of about 30° to 45° relative to said longitudinal axis of the aircraft.

8. The apparatus of claim 6 wherein said direction in which said laser beam is directed into space by said projecting means is upward and aft relative to said longitudinal axis and a front end of the aircraft.

9. An apparatus installable on an aircraft for providing external aircraft lighting to facilitate visual identification of the aircraft, said external aircraft lighting apparatus comprising:
   (a) means, disposed in the aircraft, for generating a laser beam in an interior compartment of the aircraft;
   (b) means, disposed in the aircraft and being optically coupled to the generating means, for receiving the laser beam and for transmitting the laser beam to a preselected location in the interior of the aircraft; and
   (c) means, disposed in the aircraft and being optically coupled to the transmitting means, for receiving the laser beam and for projecting the laser beam from the aircraft and into space, said laser beam being projected in a predetermined direction from the aircraft and into space and in a preselected pattern based upon at least one preselected property of said preselected pattern representing a characteristic identifying the aircraft.

10. The apparatus of claim 9 wherein said generating means includes a modulatable laser for generating a laser beam and being operable for turning "on" and "off" said laser beam for generating said laser beam in a pulse form.

11. The apparatus of claim 9 wherein said transmitting means includes:
    a beam multiplier assembly for receiving and splitting said laser beam into a plurality of separate portions; and
    a plurality of sets of beam expanding and collimating optical elements for receiving said plurality of separate portions of said beam and for transforming said plurality of separate portions of said beam by increasing cross-sectional sizes thereof.

12. The apparatus of claim 9 wherein said projecting means includes a selected one of a plurality of different color filters for transmitting said laser beam therethrough so as to have a color corresponding to the color of the selected one filter.

13. A method for providing external aircraft lighting to facilitate visual identification of the aircraft, said external aircraft lighting method comprising the steps of:
    (a) generating a light beam by operating a light beam generating device disposed on an aircraft; and
    (b) projecting the light beam by receiving and transmitting the light beam through optical devices, the light beam being projected from the aircraft into space in a preselected pattern based upon at least one property of said preselected pattern coding a physical characteristic of the aircraft for identifying the aircraft.

14. The method of claim 13 wherein said property of said preselected pattern coding the physical characteristic of the aircraft for identifying the aircraft is one of beam color, beam number and beam pulse frequency.

15. The method of claim 13 wherein said properties of said preselected pattern coding the physical characteristics of the aircraft for identifying the aircraft are beam color, number of beams and beam pulse frequency which each correspond to different ones of the physical characteristis of the aircraft, the physical characteristics of the aircraft being type of engine, number of engines and aircraft weight class.

16. The method of claim 15 wherein:
    said beam color in said preselected pattern corresponds to engine type;
    said beam number in said preselected pattern corresponds to the number of engines; and said beam pulse frequency in said preselected pattern corresponds to aircraft weight class.

17. The method of claim 13 wherein said light beam is a laser beam.

18. The method of claim 17 wherein said projecting said laser beam from the aircraft into space includes directing said laser beam into space in a predetermined direction relative to a longitudinal axis of the aircraft.

19. The method of claim 18 wherein said direction in which said laser beam is directed into space is along a path extending at an acute angle falling within the range of about 30° to 45° relative to said longitudinal axis of the aircraft.

20. The method of claim 18 wherein said direction in which said laser beam is directed into space is upward and aft relative to said longitudinal axis and a front end of the aircraft.

21. An external aircraft lighting coding system for facilitating visual identification of an aircraft, said coding system comprising:
 (a) a light pattern projected from the aircraft to exterior of the aircraft;
 (b) said light pattern being one of a plurality of laser beam patterns which correspond to the number of engines on the aircraft.

22. The coding system of claim 21 wherein said plurality of laser beam patterns range from at least one to four.

23. The coding system of claim 21 wherein each of said plurality of laser beam patterns can have one of a plurality of different colors which correspond to different types of engines on the aircraft.

24. The coding system of claim 23 wherein said different colors are a first color standing for a piston-type engine, a second color standing for a turboprop-type engine, and a third color standing for a turbojet-type engine.

25. The coding system of claim 21 wherein each of said plurality of laser beam patterns can have one of a plurality of different pulse frequencies which correspond to different weight classes of the aircraft.

26. An external aircraft lighting coding system for facilitating visual identification of an aircraft, said coding system comprising:
 (a) a light beam pattern projected from the aircraft to exterior of the aircraft;
 (b) said light beam pattern having properties for coding different characteristics of an aircraft for identifying the aircraft;
 (c) said properties of said light beam pattern being light beam color, light beam number and light beam pulse frequency.

27. The coding system of claim 26 wherein said light beam pattern is formed by a laser beam.

28. The coding system of claim 26 wherein said light beam color, light beam number and light beam pulse frequency in said light beam pattern correspond to different physical characteristis of an aircraft, said different physical characteristics of an aircraft being type of engine, number of engines and aircraft weight class.

29. The coding system of claim 26 wherein said
 said light beam color in said light beam pattern corresponds to the type of engine;
 said light beam number in said light beam pattern corresponds to number of engines; and
 said light beam pulse frequency in said light beam pattern corresponds to aircraft weight class.

* * * * *